UNITED STATES PATENT OFFICE.

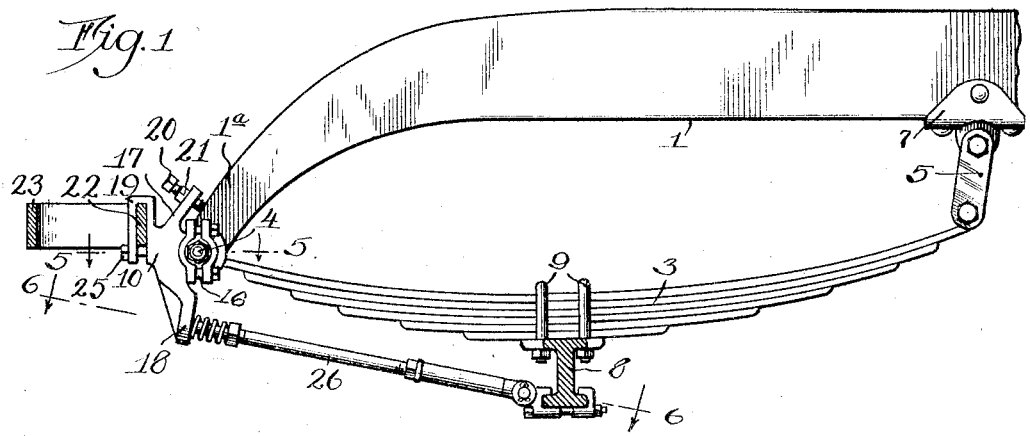
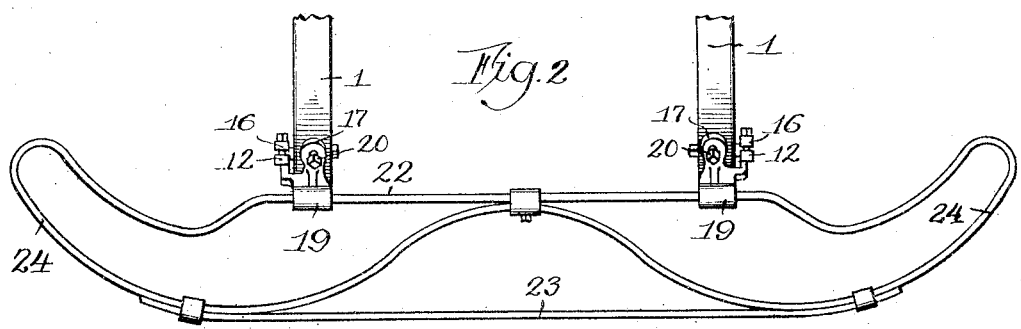
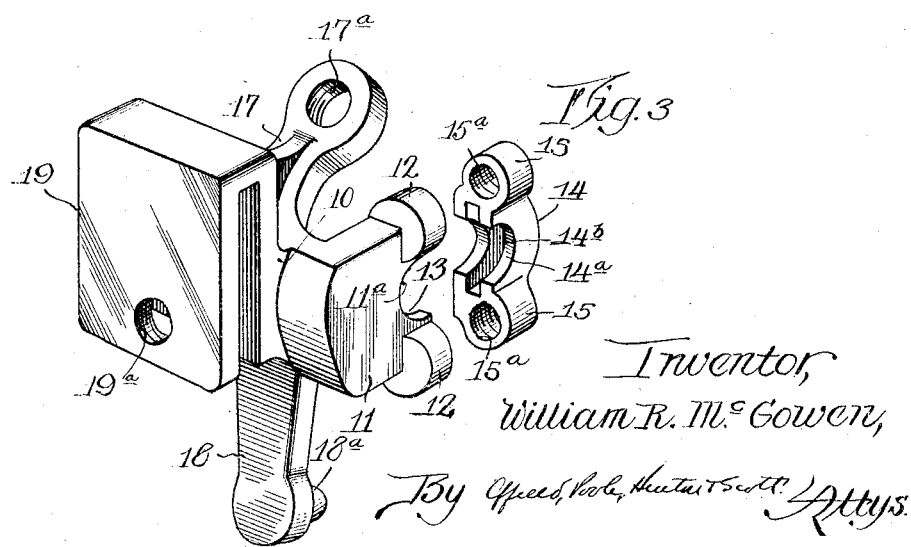

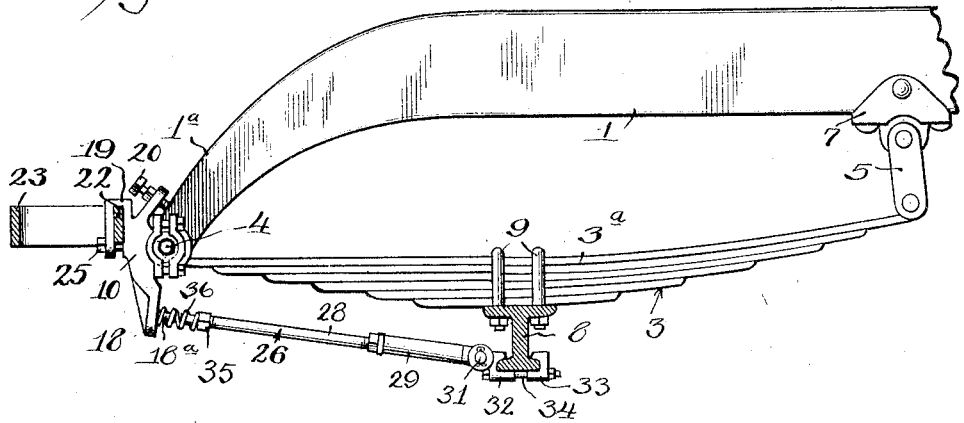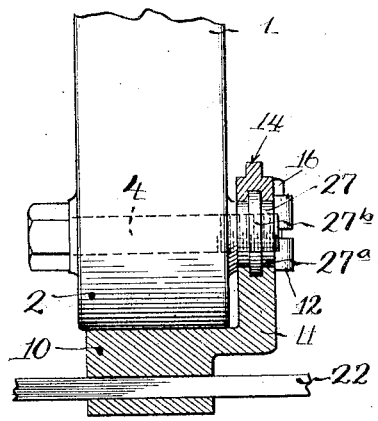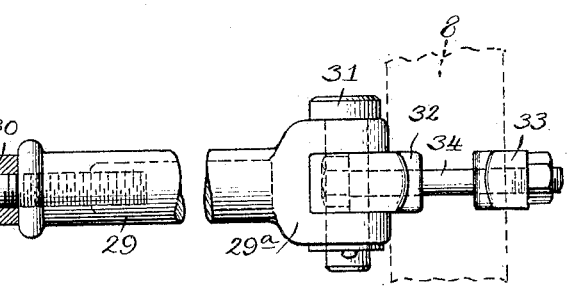

WILLIAM R. McGOWEN, OF CHICAGO, ILLINOIS.

BUMPER-SUPPORTING BRACKET.

1,419,279.　　　　　　　Specification of Letters Patent.　　Patented June 13, 1922.

Application filed March 3, 1922. Serial No. 540,692.

*To all whom it may concern:*

Be it known that I, WILLIAM R. McGOWEN, a citizen of the United States, and a resident of Chicago, in the county of Cook and State of Illinois, have invented certain new and useful Improvements in Bumper-Supporting Brackets, of which the following is a specification.

This invention relates to improvements in bumper supporting brackets, and more particularly to devices adapted to be used in attaching bumpers to the frame members of motor vehicles.

Devices of this character are usually designed with a view of enabling a bumper to be mounted upon a motor vehicle with the least amount of labor, and without cutting away, drilling, or otherwise mutilating the frame members or other portions of the vehicle immediately adjacent the point of attachment. Supporting brackets are furthermore designed to be universal, in a comparative sense, in order that a bumper may be applied to various makes of vehicles differing in some degree in dimension and design of frame members and parts to which the supporting brackets are secured.

The supporting bracket embodying the present invention is preferably of that type which is supported upon the spring bolt at the forward end of each frame member, and serves as a bearing for the adjacent end of each front spring. This method of mounting the bracket, combined with certain other improved features, is considered to be an essential development in the art for the following reasons: The necessity of protection to motor vehicles against collision, has led to the development of the present day type of bumper, constructed to withstand tremendous impacts, and therefore, with a tendency toward massive structures of considerable weight carried at the front of the vehicle. Furthermore, the advent of widened impact areas spaced a considerable distance forwardly of the points of support, has been a factor in increasing the weight of the bumper. If the weight of this forwardly projecting mass of the bumper be considered as a force acting through a lever arm having a length equal to the distance of the mass from the point of support, and at the speed of vertical movement which this mass undergoes when the vehicle is being driven at high speed, or over rough roads, the magnitude of this force, measured in foot pounds, would be found to be appreciable. This force necessarily absorbed and resisted by the frame and running gear of the vehicle, results in a constant pounding on the springs and tires of the vehicle, thus increasing, in a material degree, the wear and tear on the vehicle.

The principal object of the present invention is, therefore, to provide a bracket so constructed, and so mounted upon a vehicle, as to eliminate the added force due to the forwardly disposed weight of the bumper.

In the accompanying drawings, a preferred construction for a bumper supporting bracket is illustrated, wherein, Figure 1 is a view in side elevation of the forward portion of a motor vehicle chassis, showing the supporting bracket and bumper mounted thereon, Figure 2 is a top plan view of the forward end of the vehicle frame members with bumper attached thereto, Figure 3 is a perspective view of the parts of the bracket in position for assembling, Figure 4 is a view similar to Figure 1 with the parts of the bracket displaced to compensate for the movement of the vehicle frame, Figure 5 is an enlarged detailed view as taken on line 5—5 of Figure 1, and Figure 6 is an enlarged detailed view as taken on line 6—6 of Figure 1.

In Figure 1 has been illustrated the typical construction of the forward portion of the motor vehicle chassis, and comprising in general two longitudinal and parallel frame members 1, terminating at their forward ends in downwardly curved end portions or "horns" 1ª, having enlarged heads 2 at their extremities. Immediately below the forward end portions of the frame members 1 are springs 3—3 of the ordinary semi-elliptic type, made up of a plurality of superimposed spring leaves decreasing in length from top to bottom. The uppermost leaf 3ª of each spring 3 is provided at its ends with eyes which are secured to the frame members in the following manner. The forward end of the spring leaf has pivotal connection with the spring bolt 4 which extends transversely through the head 2 of the frame member. At the rear end, the spring leaf has pivotal connection with a spring shackle 5 which depends downwardly from the under side of the frame member 1, and in turn has pivotal connection with a shackle bracket 7 riveted to the under side of said frame member. Intermediate the ends of the springs 3 and extending transversely thereof, is the front axle 8, said axle supporting through the medium of the springs 3—3, the forward portion of the vehicle. The springs 3—3 rest on top of the axle 8, and are permanently fixed thereto by means of U-bolts 9.

The spring bolt 4 (Figure 5), is usually of the standard type having integral hexagonal head at one end, and a screw threaded portion at the other, taking a plain hexagonal nut. The bolt is ordinarily inserted from the inside of the frame member so that the nut is applied on the outside.

As hereinbefore suggested, the supporting bracket contemplated, and herein illustrated, is adapted to be supported upon the spring bolt 4, and is constructed and so mounted in the manner now to be described. As clearly shown in Figure 3, each bracket comprises in general a body portion 10 adapted to fit around and to abut against the forward annular surface of the frame head 2. Integral with the body member, and offset laterally therefrom, is an L-shaped arm 11 adapted to extend rearwardly from the body portion, and to terminate immediately adjacent the extremity of the spring bolt 4, as clearly shown in Figure 5. In the rearwardly facing end of the arm 11 is formed a semi-circular recess 11$^a$, and immediately above and below said recess is formed two cylindric shaped bosses 12—12. Cut within the surface of the recess 11$^a$ is a relatively deep groove 13, formed concentrically with said recess. Coacting with the arm 11 and forming a counterpart of the rearmost portion thereof, is a clamping block 14 provided with a complementary semi-circular recess 14$^a$ and groove 14$^b$ in its forward face, corresponding to the recess 11$^a$ and groove 13 respectively, of the arm 11. Above and below the recess 14$^a$ are formed bosses 15—15 similar to and adapted to register with bosses 12—12 of the arm 11. The bosses 16 are provided with longitudinal bores 15$^a$, there being formed in the bosses 12—12 tapped bores, not shown, adapted to receive the ends of the cap screws 16 inserted through the bores 15$^a$ of the block 14, and anchored in said bosses 12—12 in the operation of securing the bracket to the frame member, as will presently be set forth. In addition to the arm 11, there is formed integral with the body 10 of the bracket, an upwardly extending arm 17, a downwardly extending arm 18, and a forwardly disposed U-shaped clamping block 19. As clearly shown in Figure 1, the arm 17 is inclined rearwardly and substantially parallel with the top face of the downwardly curved or inclined end portion 1$^a$ of the frame member 1. The extremity of the arm 17 is rounded and the tapped hole 17$^a$ formed therein, said hole being adapted to carry a set screw 20, which extends through said arm and bears against the top surface of the frame member 1. The set screw 20 is preferably provided with a lock nut 21. The clamping member 19 has preferably the form of a vertically disposed block slotted vertically from below, thus assuming an inverted U-shape. Within this clamping block is inserted the rearwardly disposed transverse bar 22 of the bumper, the same including, in addition to said rear bar 22 a forwardly disposed impact member 23, and rearwardly and inwardly curved end portions 24—24. The bumper is clamped within the block 19 by means of a cap screw 25, which is inserted through the hole 19$^a$ formed adjacent the lower edge of the block below the bar 22, and anchored in the body portion 10 of the bracket.

The downwardly extending arm 18, as clearly shown in Figure 1, is an extension of the body portion 10, projecting substantially in a vertical direction downwardly, immediately below the head 2, although inclined slightly to the vertical in a forwardly direction. Upon the rearwardly facing surface of the arm 18 is cast a tapered lug 18$^a$. Extending from the lower end of the arm 18 to the axle 8 is a thrust or radius rod 26, consisting of members, which will be described presently, it being considered desirable, first, to describe the manner in which the main portion of the bracket is mounted upon the end of the frame member. As hereinbefore indicated, the spring bolt 4 is ordinarily provided at its threaded end with a standard hexagonal nut, which is for the purpose of attaching the bracket, and a special nut or flange collar 27 is applied in its place. This special nut, as clearly shown in Figure 5, consists of an internally threaded cylindric collar 27$^a$, having integral and radially extending flange 27$^b$ surrounding the central portion thereof. The external dimensions of the nut 27 correspond closely to the dimensions of the complementary recesses 11$^a$ and 14$^a$, and grooves 13 and 14$^b$ of the arm 11 and block 14 of the bracket, so that having placed the special nut on the threaded end of the spring bolt 4, the coacting parts of the bracket are clamped together over the nut and the cap screws 16 inserted through the bosses 15 and into the bosses 12, thus drawing the nut engaging parts together in tight clamping engagement with the nut, as clearly shown in Figure 5. In order to insure the proper alignment of the bumper with respect to the vertical, the bracket may be subsequently adjusted about the axis of the spring bolt by means of a set screw 20, such adjustment preventing vertical displacement of the bumper in an upward direction.

Referring now to the radius rod 26, the same extends from the axle 8 forwardly to the lower end of the downwardly extending arm 18 of the bracket. This rod consists of parts as follows: The forward section is a solid rod 28 having at its rear end a screw threaded portion telescoping within a tubular sleeve 29. Mounted on the rod 28 is a lock nut 30, which may be loosened for the purpose of permitting the rod to be screwed endwise into and out of the tubular sleeve 29 for the purpose of increasing or decreasing the overall length of the entire radius rod. The rear end of the tubular sleeve 29 is provided with a forked extremity 29ᵃ having pivotal connection through the medium of a hinge pin 31 with a clip 32. The clip 32, together with a companion clip 33, connected by a bolt 34, forms a hanger adapted to be securely attached to the lower flange of the axle 8, which, as clearly shown in Figure 1, is an I-beam section. The forward end of the radius rod, and particularly the forward end of the solid rod 28 thereof, has abutting engagement with the end surface of the tapered lug 18ᵃ at the lower end of the arm 18. The portion immediately adjacent to the forward or free end of the rod 28 is threaded, and carries a nut 35 positioned a short distance rearwardly from the extremity of the rod. Between the nut and the end of the arm 18 is a coil spring 36 which surrounds the tapered lug 18ᵃ, and the extreme end portion of the rod 28. This spring is preferably under compression when the ends of the rod 28 and lug 18ᵃ are in contact with each other.

Manifestly, there is a radius rod associated with each bracket, each extending from the axle 8, directly forward beneath each spring 3, and normally in abutting engagement with the lower end of the downwardly extending bracket arm 18, in the manner already described. Furthermore, the axis of each radius rod is substantially at right angles to a line or radius drawn through the axis of the spring bolt, and parallel with said arm. It may therefore be assumed that if the bracket were free to rotate in a counterclockwise direction about the axis of the spring bolt, that such rotative movement would be resisted by the radius rod, which would take the thrust or force directly along its axis, transmitting the same to the axle 8.

The purpose of the radius rod and the advantages derived therefrom will be better understood from the following discussion: If the weight of the forwardly disposed portions of the bumper be considered as concentrated at a point in the plane of the forward impact member 23 thereof, it is manifest that the actual force exerted would be equal to the weight multiplied by the distance of the weight from the axis of the spring bolt; namely, the length of the lever arm. This force is further increased by the movement of the bumper vertically with the elevation and depression of the vehicle in passing over obstructions and rough roads. Likewise, the inertia of the bumper under sudden displacements of the vehicle, greatly increases the force exerted by the weight of the bumper. If this force could be measured in foot pounds, it would be found to be considerable, and in the absence of means of resistance, other than the vehicle frame at the point of support, there would necessarily be a constant pounding on the frame, springs, and tires, which would have a detrimental effect in the increased wear strain.

The presence of the radius or thrust rod 26 acting through a somewhat shorter lever arm, as determined by the length of the arm 18, resists the force which tends to rotate the bumper and bracket bodily in a counterclockwise direction about the axis of the spring bolt, and thus removes the force exerted by the weight of the bumper, from the frame, and delivers the same directly to the axle, it being manifest that otherwise this force would be transmitted through the frame and springs. Inasmuch as the axle 8 is movable relative to the frame 1, due to the spring action of the springs 3, the radius rod is pivoted at each end, thus at its forward end it is free to yield in contact with the lug 18ᵃ, and at the same time the parts are retained in alignment by means of a spring 36. It is to be pointed out, however, that the spring 36 at no time acts as a compression spring to resist the force transmitted through the radius rod, but serves merely as a yieldable and flexible connecting member between the abutting ends of the radius rod and arm 18. Furthermore, as clearly shown by comparing Figures 1 and 4, the action of the springs 3 is such that they tend to flatten out, with the result that the distance from the axle to the spring bolt is slightly increased. It follows, therefore, that there will be a tendency for the abutting ends of the rod and arm 18 to separate, whereupon the spring 36 will be slightly extended, as shown in Figure 4, though, perhaps, slightly exaggerated.

Having fully described a preferred construction of the bracket, and the advantages derived therefrom, I claim as my invention:

1. A bumper supporting bracket adapted to be attached at the end of a vehicle frame member, and comprising an arm extending radially from the point of attachment, and a rod extending from the vehicle axle to the end of said arm.

2. A bumper supporting bracket adapted to be mounted at the front end of a vehicle frame member, and a thrust rod interposed between the vehicle axle and said bracket.

3. A bumper supporting bracket adapted to be attached at the front end of a vehicle frame member, and to support a bumper extended forwardly thereof, and a thrust rod connected at one end with the vehicle axle, and engaging said bracket below the point of attachment.

4. A bumper supporting bracket adapted to be clamped to the spring bolt mounted at the front end of a vehicle frame member, and adapted to support a bumper extended forwardly thereof, and a thrust rod connected at one end with the vehicle axle and engaging said bracket at a point disposed radially from said spring bolt.

5. A bumper supporting bracket adapted to be attached at the end of a vehicle frame member, and to support a bumper extending therebeyond, said bracket comprising an arm extending radially downward from the point of attachment, and a thrust member extending from said arm to the vehicle axle.

6. A bumper supporting bracket adapted to be mounted at the end of a vehicle frame member, having clamping engagement with a spring bolt extending through said end of the frame member, and a thrust rod secured at one end to the vehicle axle, and extending forwardly and engaging said bracket at a point radially disposed from said spring bolt.

7. A bumper supporting bracket adapted to be secured in abutting engagement with the end of the vehicle frame member, and comprising a forwardly disposed clamp adapted to engage a bumper, a radial arm extending downwardly, and a thrust rod having abutting engagement with said arm, and pivotally mounted upon the vehicle axle.

8. A bumper supporting bracket adapted to be clamped to the end of a vehicle frame member, and comprising a forwardly disposed clamp adapted to engage a bumper, a radial arm extending downwardly, and a thrust rod having yielding abutting engagement with the end of said arm, and pivotally connected with the vehicle axle.

9. A bumper supporting bracket adapted to be attached at the end of a vehicle frame member, and comprising clamping members engaging a nut mounted on the spring bolt passing through said end of the frame member, a forwardly disposed clamp adapted to engage a bumper, a radially disposed arm projecting downwardly from said body member, and an extensible rod secured to the vehicle axle and having abutting engagement with the end of said arm.

10. A bumper supporting bracket comprising a body member having abutting engagement with the end of the vehicle frame member, clamping members engaging a nut mounted on the spring bolt passing through said end of the frame member, a forwardly disposed clamp adapted to engage a bumper, an arm projecting downwardly from said body member, and an extensible thrust rod pivotally connected with the vehicle axle and extending forwardly in abutting engagement with the end of said arm.

In witness whereof, I hereunto subscribe my name this 25th day of February, A. D. 1922.

WILLIAM R. McGOWEN.